United States Patent [19]

Suzuki et al.

[11] Patent Number: 5,200,833
[45] Date of Patent: Apr. 6, 1993

[54] SIGNAL LEVEL CLAMPING APPARATUS FOR A CTDM VIDEO SIGNAL

[75] Inventors: Yoshinori Suzuki; Yoshiyuki Suzuki; Kazuo Ido, all of Kanagawa, Japan

[73] Assignee: Sony Corporation, Tokyo, Japan

[21] Appl. No.: 826,396

[22] Filed: Jan. 27, 1992

[30] Foreign Application Priority Data

Jan. 31, 1991 [JP] Japan .................................. 3-011310

[51] Int. Cl.$^5$ .......................... H04N 5/78; H04N 9/89
[52] U.S. Cl. .................................... 358/320; 358/310; 358/34; 358/14
[58] Field of Search ............... 358/310, 320, 321, 316, 358/315, 324, 326, 14, 34, 172; 360/36.1

[56] References Cited

U.S. PATENT DOCUMENTS

| | | | |
|---|---|---|---|
| 4,084,181 | 4/1978 | Mita et al. ............................ | 358/323 |
| 4,214,269 | 7/1980 | Chang .................................. | 358/321 |
| 4,617,590 | 10/1986 | Dann .................................... | 358/34 |
| 4,714,965 | 12/1987 | Yoshinaka et al. .................. | 358/320 |
| 4,750,051 | 6/1988 | Kaneko et al. ....................... | 358/34 |

Primary Examiner—Tommy P. Chin
Assistant Examiner—Huy Nguyen
Attorney, Agent, or Firm—Alvin Sinderbrand; William S. Frommer

[57] ABSTRACT

A signal level clamping apparatus for a CTDM video signal used for a time-base correction apparatus has a clamping circuit supplied with a reproduced color difference signal wherein, between adjacent two horizontal sync. signals, a first and second time-compressed color difference line signals are sequentially arranged with a predetermined interval therebetween, a time-base correction unit supplied with an output from the clamping circuit, a sync. signal separator circuit for separating a reproduced horizontal sync. signal from the reproduced color difference signal supplied thereto, a write clock signal generating circuit for generating a write clock signal synchronized with the reproduced horizontal sync. signal from the sync. signal separator circuit and for applying the write clock signal to the time-base correction unit, and a clamping pulse generating circuit for generating a clamping pulse synchronized with the reproduced horizontal sync. signal from the sync. signal separator circuit and for applying the clamping pulse to the clamping circuit, wherein, in response to the clamping pulse, the clamping circuit clamps a portion of a predetermined level within a space between the first and second time-compressed color difference line signals arranged between the adjacent horizontal sync. signals of the reproduced color difference signal is clamped.

4 Claims, 2 Drawing Sheets

SIGNAL LEVEL CLAMPING APPARATUS FOR A CTDM VIDEO SIGNAL

BACKGROUND OF THE INVENTION

1. Field of the Invention

The present invention generally relates to a clamping apparatus, and more particularly, is directed to a signal level clamping apparatus for a CTDM video signal used for a time-base correction apparatus which is suitable for application to a time-base correction apparatus of a Betacam video tape recorder (VTR).

2. Description of the Prior Art

According to the conventional Betacam VTR, each of a luminance signal and a time-compressed color difference signal is pre-emphasized and is separately subjected to frequency modulation (FM), then both the frequency-modulated luminance signal and the frequency-modulated color difference signal are recorded on a magnetic tape by a rotary magnetic head to form slant tracks on the tape. During reproduction, the frequency-modulated luminance signal and the frequency-modulated color difference signal are reproduced from the magnetic tape by the rotary magnetic head and then subjected to frequency demodulation to thereby obtain the luminance signal and the time-compressed color difference signals which are then de-emphasized. The de-emphasized luminance signal and time-compressed color difference signals are supplied to a time-base correction apparatus for time-correcting these signals.

In the time-base correction apparatus, the de-emphasized time-compressed color difference signal is supplied to a time-base correction unit through a clamping circuit. The de-emphasized time-compressed color difference signal as shown in FIG. 1A includes, between adjacent two horizontal synchronizing (sync.) signals, two kinds of time-compressed color difference line signals, that is, a red color difference line signal (R - Y) and a blue color difference line signal (B - Y); sequentially arranged with a predetermined time interval or space therebetween. A reproduced horizontal sync. signal is extracted from the reproduced color difference signal by a sync. separating circuit, then a clamping pulse shown in FIG. 1B and a write clock signal are generated in synchronism with the reproduced horizontal sync. signal. The clamping pulse and the write clock signal are applied to the clamping circuit and the time-base correction unit, respectively, thereby clamping in response to the clamping pulse a pedestal portion within a space between each of the horizontal sync. signals and the color difference line signal contiguous thereto of the reproduced color difference signal, as shown in FIG. 1.

However, in the conventional clamping apparatus for a time-base correction apparatus, while there is no problem in the normal playback mode of the VTR, constants in a de-emphasizing circuit in the variable speed playback mode become different from those of the pre-emphasizing circuit. Thus, an overshoot portion or an undershoot portion appears at a trailing edge portion of the horizontal sync. signal as shown in phantom in FIG. 1A. Accordingly, the prior-art clamping apparatus has the disadvantage that the clamping operation can not be performed accurately when clamping a pedestal portion within a space between each of the horizontal sync. signals and the color difference line signal contiguous thereto of the reproduced color difference signal.

OBJECTS AND SUMMARY OF THE INVENTION

Therefore, it is an object of the present invention to provide an improved signal level clamping apparatus for a CTDM video signal used for a time-base correction apparatus in which the aforementioned shortcomings and disadvantages encountered with the prior art can be eliminated.

More specifically, it is another object of the present invention to provide a signal level clamping apparatus for a CTDM video signal for a time-base correction apparatus which can accurately clamp a signal level of the reproduced color difference signal even in the variable speed playback mode.

As an aspect of the present invention, a signal level clamping apparatus for a CTDM video signal used for a time-base correction apparatus is comprised of a clamping circuit supplied with a reproduced color difference signal wherein, between two adjacent horizontal sync. signals, first and second time-compressed color difference line signals are sequentially arranged with a predetermined interval therebetween, a time-base correction unit supplied with an output from the clamping circuit, a sync. signal separator circuit for separating a reproduced horizontal sync. signal from the reproduced color difference signal supplied thereto, a write clock signal generating circuit for generating a write clock signal synchronized with the reproduced horizontal sync. signal from the sync. signal separator circuit and for applying the write clock signal to the time-base correction unit, and a clamping pulse generating circuit for generating a clamping pulse synchronized with the reproduced horizontal sync. signal from the sync. signal separator circuit and for applying the clamping pulse to the clamping circuit, wherein, in response to the clamping pulse, the clamping circuit clamps a portion of a predetermined level within a space between the first and second time-compressed color difference line signals arranged between the adjacent horizontal sync. signals of the reproduced color difference signal.

According to the clamping apparatus of the present invention, the reproduced color difference signal can be clamped accurately even in the variable speed playback mode.

The preceding and other objects, features, and advantages of the present invention will become apparent from the following detailed description of an illustrative embodiment thereof when read in conjunction with the accompanying drawings.

DESCRIPTION OF THE PREFERRED EMBODIMENT

A signal level clamping apparatus for a CTDM video signal according to an embodiment of the present invention will now be described with reference to FIGS. 2 and 3, which illustrate application of, the present invention is to the Betacam VTR.

In the Betacam VTR, each of a luminance signal and a time-compressed color difference signal is pre-emphasized and separately subjected to frequency modulation, then both the frequency-modulated luminance signal and the frequency-modulated color difference signal are recorded on a magnetic tape by a rotary magnetic head to form slant tracks on the tape. During reproduction, the frequency-modulated luminance signal and the frequency-modulated color difference signal, are reproduced by the rotary magnetic head from the magnetic tape and subjected to frequency demodulation to thereby obtain the luminance signal and the time-compressed color difference signal which are then de-emphasized. The de-emphasized luminance signal and time-compressed color difference signal are supplied to a time-base correction apparatus for time-correcting these signals.

Figure 1A:
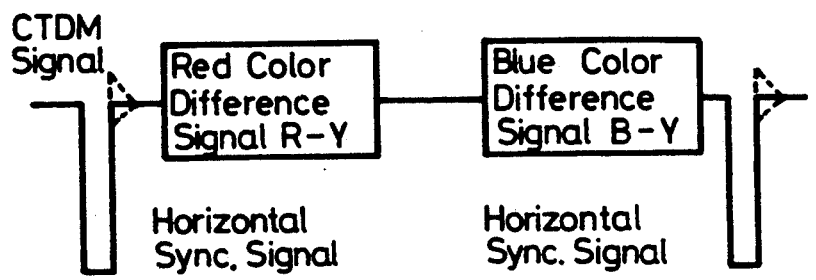
FIGS. 1A and 1B are respectively waveform diagrams showing reproduced color difference signals and a clamping pulse used to explain the operation of the conventional clamping apparatus for a time-base correction apparatus.
Figure 1B:
Figure 3A:
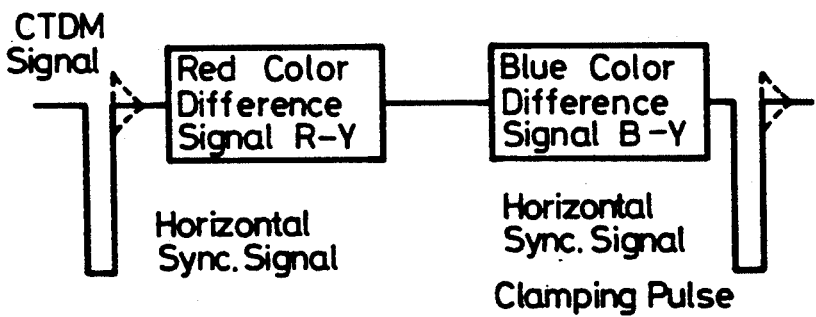
FIGS. 3A and 3B are respectively waveform diagrams showing reproduced color difference signals and a clamping pulse used to explain the operation of the embodiment of the present invention.
Figure 2:
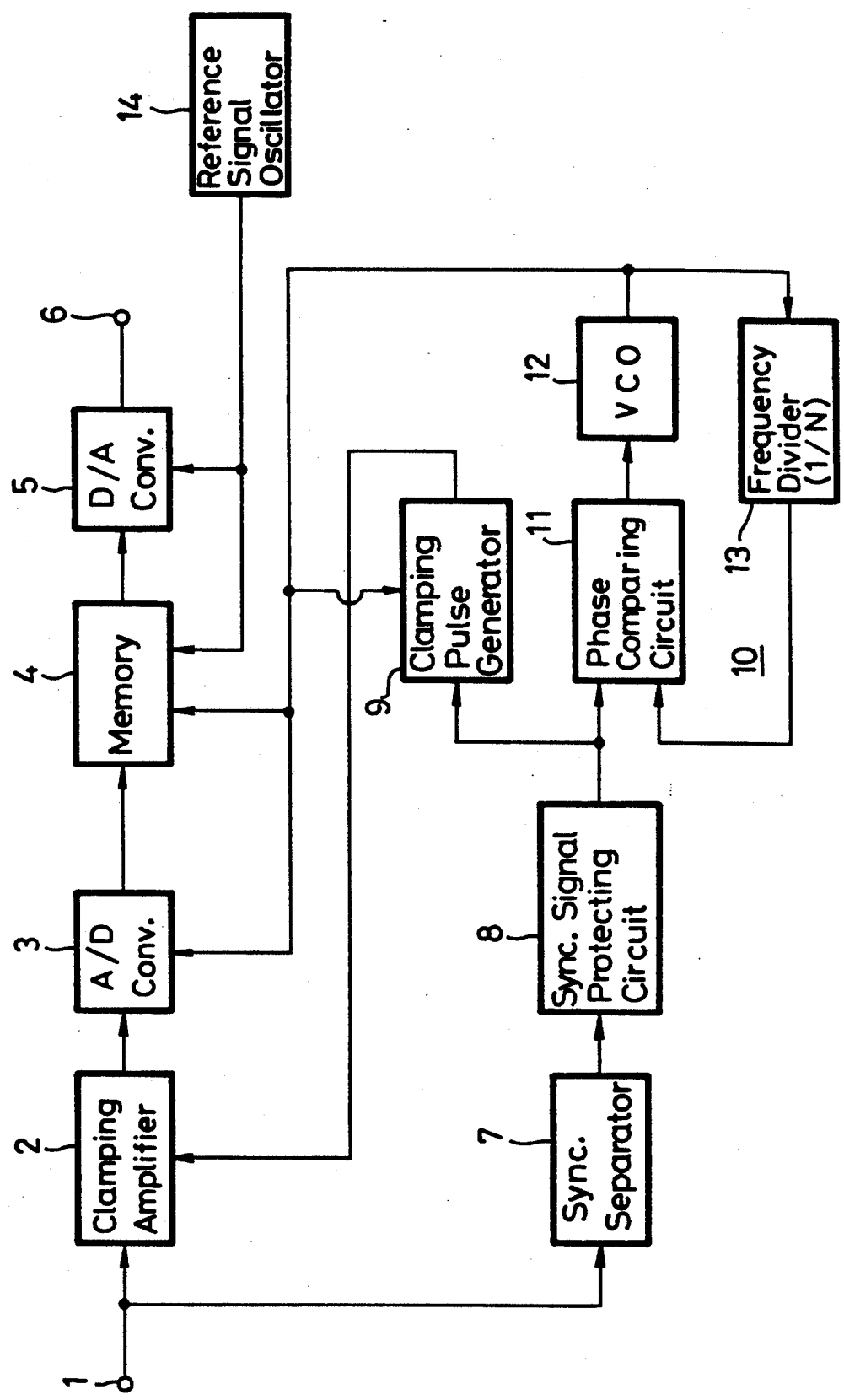
FIG. 2 shows in block form an arrangement of a signal level clamping apparatus for a CTDM video signal for a time-base correction apparatus according to an embodiment of the present invention.

FIG. 2 shows an arrangement of a clamping apparatus for a time-base correction apparatus according to the invention. Referring to FIG. 2, a reproduced color difference signal is applied to an input temrinal 1. The de-emphasized time-compressed color difference signal includes between two, between adjacent two horizontal sync. signals, kinds of time-compressed color difference line signals, that is, a red color difference signal (R - Y) and a blue color difference signal (B - Y) which are sequentially arranged with a predetermined time interval or space therebetween as shown in FIG. 3A. The reproduced color difference signals (R - Y) and (B - Y) are applied to a clamping amplifier 2 for clamping a signal level of input signal. The clamped color difference signals from the clamping amplifier 2 are applied to an analog-to-digital (A/D) converter 3 of a time-base correction unit which includes the A/D converter 3, a memory 4 and a digital-to-analog converter 5, etc.

The reproduced color difference signal from the input terminal 1 is also applied to a sync. separator circuit 7 and the reproduced horizontal sync. signal separated by the sync. separator circuit 7 is applied to a sync. signal protecting circuit (window circuit) 8 in which noise is removed from the horizontal sync. signal. The horizontal sync. signal from the protecting circuit 8 is applied to a clamping pulse generator 9 and an automatic frequency controlling (AFC) circuit (write clock signal generator) 10.

Figure 3B:

The clamping pulse generator 9 generates, in a normal playback mode, a clamping pulse at a timing delayed by a half horizontal period from the horizontal sync. signal as shown in FIG. 3B. The clamping pulse is applied to the clamping amplifier 2 which clamps a pedestal portion within a space between the two kinds of time-compressed color difference line signals, that is, the red and blue color difference signals (R - Y) and (B - Y) arranged between the neighboring horizontal sync. signals of the reproduced color difference signal shown in FIG. 3A is clamped.

The reproduced color difference signal clamped by the clamping amplifier 2 is supplied to the A/D converter 3 and a digital signal from the A/D converter 3 is stored in the memory 4. In the write clock generator (AFC) 10, the reproduced horizontal sync. signal from the sync. signal protection circuit 8 is supplied to a phase comparator 11 and a comparison result signal from the phase comparator 11 is supplied to a voltage controlled oscillator (VCO) 12 to control the oscillation frequency thereof. The oscillation frequency of the VCO 12 is selected to be 13.5 MHz, for example, which is equal to 858 and 864 times as large as the horizontal frequency when the NTSC and PAL television signals are employed, respectively. The oscillation signal from the VCO 12 is applied to a frequency divider 13 for dividing the frequency thereof by a factor N (N is an integer). The integer N is set to be 858 and 864 when the NTSC and PAL television signals are employed, respectively. The frequency divided signal from the frequency divider 13 is applied to the phase comparator 11 and compared in phase with the horizontal sync. signal from the sync. signal protection circuit 8.

The write clock signal is supplied to a counter included in the clamping pulse generator 9 in which a delay time of the clamping pulse with respect to the horizontal sync. signal can be determined by the counter. The period of the write clock signal is proportional to a tape transport velocity of the VTR, so that the time delay of the clamping pulse with respect to the horizontal sync. signal also changes in proportional to a ratio of the tape transport speed in the variable speed playback mode to that in the normal play back mode. Thus, if the counter of the clamping pulse generator 9 is designed to generate the clamping pulse upon counting N/2 write clock pulses after the reception of the reproduced horizontal sync. signal, the clamping pulse can always be generated at the center of the time-compressed red and blue color difference line signals (R - Y) and (B - Y) as shown in FIG. 3.

In case of reading the signals stored in the memory 4, a reference signal of 13.5 MHz is supplied from a reference signal oscillator 14 to the memory 4 and the D/A converter 5, so that the reproduced color difference signal read out from the memory 4 is converted into an analog signal by the D/A converter 5 and then applied to an output terminal 6. Now, the frequency of the reference signal is normally fixed but it is subjected to phase modulation in accordance with the reproduced horizontal sync. signal when performing a velocity error correction.

As set out above, according to this invention, the signal level clamping apparatus for a CTDM video signal used for a time-base correction apparatus is constituted so as to comprise a clamping circuit being supplied with a reproduced color difference signal wherein, between two adjacent horizontal sync. signals, first and second color difference line signals are sequentially arranged with a predetermined interval therebetween, a time-base correction unit supplied with an output from the clamping circuit, a sync. signal separator circuit for separating a reproduced horizontal sync. signal from the reproduced color difference signal supplied thereto, a write clock signal generating circuit for generating a write clock signal synchronized with the reproduced horizontal sync. signal from the sync. signal separator circuit and for applying the write clock signal to the time-base correction unit, and a clamping pulse generating circuit for generating a clamping pulse synchronized with the reproduced horizontal sync. signal from the sync. signal separator circuit and for applying the clamping pulse to the clamping circuit, wherein, in response to the clamping pulse, the clamping circuit clamps of a predetermined level within a space between the first and second time-compressed color difference line signals arranged between the adjacent horizontal sync. signals of the reproduced color difference signal. Therefore, the clamping operation can be performed accurately even during variable speed playback.

Having described the preferred embodiment of the invention with reference to the accompanying drawings, it is to be understood that the invention is not limited to that precise embodiment and that various changes and modifications thereof may be effected by one skilled in the art without departing from the spirit or scope of the invention as defined in the appended claims.

What is claimed is:

1. In a time-base correction apparatus of a video tape recorder/reproducer, said apparatus having a time-base correcting unit for correcting time-base errors in a reproduced color difference signal which includes adjacent horizontal synchronizing signals and first and second time-compressed color difference line signals sequentially arranged between said adjacent synchronizing signals with a predetermined interval between said color difference line signals; a signal level clamping apparatus comprising:

a clamping circuit for receiving said reproduced color difference signal and providing a clamped output signal to said time-base correction unit;

a synchronizing signal separator circuit for receiving said reproduced color difference signal and separating said horizontal synchronizing signals from said reproduced color difference signal;

a write clock signal generating circuit for receiving separated horizontal synchronizing signals from said synchronizing signal separating circuit, generating a write clock signal synchronized with said separated horizontal synchronizing signals, and applying said write clock signal to said time-base correction unit to control writing of said clamped output signal into said time-base correction unit; and a clamping pulse generating circuit for receiving said separated horizontal synchronizing signals from said synchronizing signal separating circuit and applying a clamping pulse to said clamping circuit in timed relationship to said separated horizontal synchronizing signals so that said clamping circuit clamps said reproduced color difference signal during said predetermined intervals between said first and second color difference line signals.

2. A time-base correction apparatus according to claim 1, wherein said clamping pulse generating circuit receives said write clock signal and includes a counter for counting said write clock signal in response to said separated horizontal synchronizing signals and generates said clamping pulse when a count value of said counter reaches a predetermined value.

3. A time-base correction apparatus according to claim 1, wherein said horizontal synchronizing signals have a period that is proportional to a tape transport velocity of said videotape recorder/reproducer and said write clock signal generating circuit includes means for generating said write clock signal with a period that is proportional to said tape transport velocity.

4. A time-base correction apparatus according to claim 3, wherein said write clock signal generating means comprise a a phase comparator, a voltage controlled oscillator for generating an oscillation signal that is said write clock signal, and a frequency divider for frequency-dividing said oscillation signal and providing a frequency-divided oscillation signal to said phase comparator; and wherein said phase comparator compares the respective phases of said separated horizontal synchronizing signals and said frequency-divided oscillation signal and outputs a signal to said voltage controlled oscillator for controlling the frequency of said oscillation signal in accordance with a result of the comparison of said respective phases.

* * * * *